Feb. 7, 1933.    M. LOUGHEAD    1,896,453
BRAKE MECHANISM
Filed April 10, 1929    2 Sheets-Sheet 1

Inventor
Malcolm Loughead
By Williams, Bradbury, McCaleb & Hinkle
Attys.

Feb. 7, 1933. M. LOUGHEAD 1,896,453
BRAKE MECHANISM
Filed April 10, 1929 2 Sheets-Sheet 2
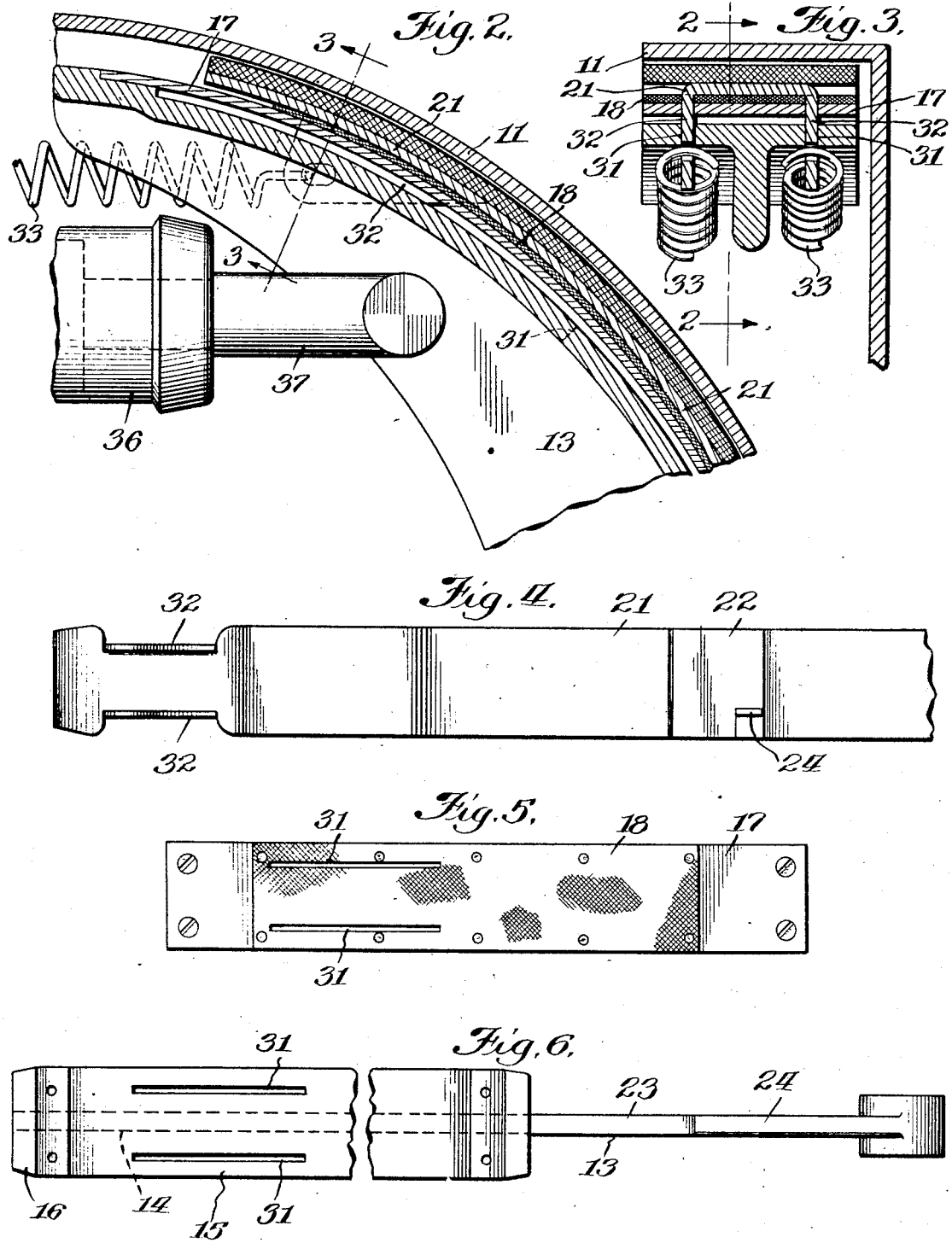

Patented Feb. 7, 1933

1,896,453

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

BRAKE MECHANISM

Application filed April 10, 1929. Serial No. 353,909.

This invention relates to a vehicle brake mechanism.

A disadvantage in the usual type of brake mechanism having pivotally mounted shoes is that only one of the shoes is applied in the direction of rotation of the drum, exerting a so-called wrapping effect which increases the braking action while the other shoe is applied in the opposite direction which results in inefficient braking and requires a large braking effort.

The present invention combines the advantages obtained from the flexible band type of brake mechanism in which the wrapping effect is effective over a large area of the frictional surfaces with the advantages of pivotally mounted brake shoes.

One of the chief difficulties encountered in the band type of brake mechanism is that the band expands due to the heat generated by the friction and thereby changes the length of the band and the distance between the ends of the band and the applying means which force the band into engagement with the drum, with the result that if the applying means is properly adjusted for applying the brakes when the band is cold the adjustment will be disturbed when the band becomes heated.

An object of the present invention is to provide a new and improved brake mechanism.

A further object is to provide a brake mechanism in which the wrapping effect of the rotating drum is used to full advantage.

A further object is to provide a brake mechanism for a vehicle in which the wear of the friction member is reduced to a minimum, thereby obviating the necessity for frequent adjustments.

A further object is to provide a brake mechanism for a vehicle in which the distance of movement of the applying means is not affected by a variation in the length of the band due to temperature changes.

A further object is to provide a brake mechanism which is self-compensating for heating effects produced by the application of the brakes.

Other objects and advantages will appear as the description proceeds.

In accordance with the general features of the invention, a floating friction band is provided which is engaged with the rotatable drum by a pair of rigid pivotally mounted brake shoes having a low friction metal engaging the band over which the band may slide in response to the friction of the drum, allowing the band to adjust itself to engage substantially the entire periphery of the drum and exert a large braking action on the drum.

Referring to the drawings:

Fig. 2 is a sectional view taken on the line 2—2 of Fig. 3;

Fig. 3 is a cross-section taken on the line 3—3 of Fig. 2;

Fig. 4 is an elevation of the brake band taken on the line 4—4 of Fig. 1;

Fig. 5 is a detail view of a portion of the brake shoe taken on the line 5—5 of Fig. 1;

Fig. 6 is a detail view of one of the brake shoes.

Figure 1:
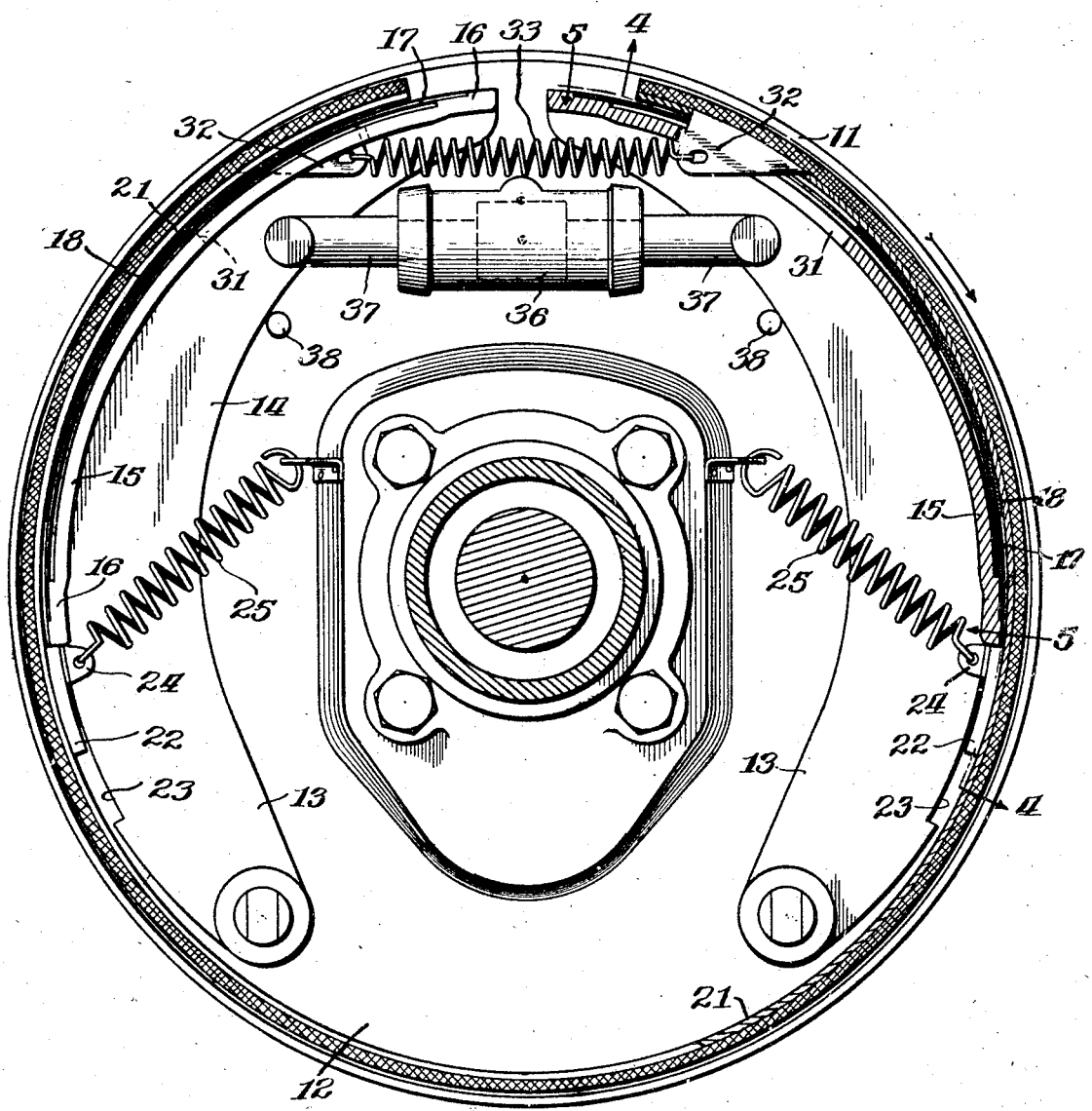
Fig. 1 is a side elevation partly in section of a brake mechanism embodying the invention.

In the drawings, a drum 11 is shown which is attached to a rotatable wheel, not shown, of a vehicle. A pan or support 12 for supporting the operating parts of the brake mechanism is mounted upon an axle of a vehicle and is stationary with respect thereto. Pivotally mounted upon support 12 is a pair of rigid brake shoes 13, each of which has an inwardly extending flange 14 carrying an arcuate cylindrical portion 15 facing the drum. The ends of the arcuate portion 15 are raised as at 16, and a flexible band 17 is attached to the raised ends in such a manner that the band will be spaced slightly from the arcuate portion 15. The band 17 has secured to its outer surface a metallic strap 18 of the same width as band 17 but shorter than this band so that it will extend over the band only in that portion of the band which is spaced from the arcuate surface 15. The strap 18 is made of a low friction material such as oilless bearing metal, as for instance, graphite bronze.

Extending around the pivoted shoes is a metal band 21 provided with a brake lining of the usual type. The band extends from the toe of one of the brake shoes around the inner periphery of the brake drum to the toe of the other brake shoe.

Band 21 has a pair of anchor members 22 secured thereto which are positioned within slots 23, one of which is provided in each of the brake shoes. The anchor members have lugs 24 to which springs 25 are secured, the opposite ends of the springs being attached to support 12 at a point above the point of attachment to the band, so that the springs will tend to raise the band upwardly. The upward movement of the band is limited by anchor members 22 engaging the upper ends of slots 23. Band 21 is so shaped that when anchor members 22 engage the upper portion of the slot, the lower portion of the band will be spaced from drum 11. The upper ends of the brake shoes are provided with longitudinal slots 31 which extends through strap 18, band 17 and through the arcuate surface 15.

The ends of band 21 are provided with inwardly extending flanges 32 which project through slots 31 in the brake shoes. Springs 33 engage apertures in the flanges 32 and serve to draw the ends of band 21 away from drum 11 and hold them in engagement with the brake shoes. It will be noted that springs 25 as well as springs 33 serve to retract the shoes as well as the band from engagement with the brake drum.

A hydraulic cylinder 36 is attached to support 12 and when a fluid pressure is produced in this cylinder, plungers 37, the ends of which engage the pivotally mounted shoes, are moved outwardly to pivot the brake shoes toward the drum. When the brake shoes have moved sufficiently far to engage the lining of band 21 with the drum, the friction between the drum and the lining, which is greater than the friction between the band and strap 18, causes the band to move in the direction of rotation of the drum. With the drum rotating in the direction shown by the arrow in Fig. 1, it will be seen that the rotating movement of the left side of band 21 is limited by the anchor member 22 engaging the end of the slot 23. The right side of the band, however, will rotate until the clearance between the band and the lower part of the drum is taken up. In this manner the entire band is engaged with the drum and the wrapping effect of the drum will extend around the entire right side of the band to anchor member 22 at the left side of the band. If the drum is rotated in the opposite direction, the same effect will be had except that the wrapping effect will be transferred to the opposite end of the band. The portions of the band overlying the arcuate portion 15 of the brake shoe are uniformly engaged with the drum due to the fact that band 17 is flexible, allowing it to assume the shape of the band, which in turn assumes the shape of the drum against which it is pressed.

Upon release of the pressure in cylinder 36 springs 25 will raise the band upwardly to provide a clearance between the band lining and the drum and springs 33 will draw the ends of the band together and pivot the shoes inwardly to withdraw the ends of the bands from the drum. Stop means 38 may be provided to limit the inward movement of the brake shoes.

It frequently happens that in descending long inclines the drum of the brake mechanism becomes heated and expands, tending to move the drum away from the bands. A portion of the heat from the drum will be communicated to the metallic bands through the brake lining. The bands 17 as well as bands 21, will, therefore, expand and tend to maintain substantially the same clearance between the drum and bands 21 at all temperatures.

The apparatus disclosed provides an efficient braking mechanism requiring but a small braking effort due to the fact that the wrapping effect of the rotating drum is used to substantially full advantage, and due to the fact that the apparatus is self-compensating for temperatures, the apparatus may be used without repairs or adjustment for a long period of time without requiring attention.

Having described the nature and embodiments of my invention, what I desire to secure by United States Letters Patent is as follows:

1. In a brake mechanism, a rotatable brake drum, a pair of pivotally mounted shoes having a surface of similar contour as the drum facing the drum, a raised portion at the ends of said surfaces, a flexible band for each shoe having its ends attached to said raised portions, thereby spacing the band from the intermediate portion of the shoe, a low friction member secured to each band, a brake band extending from toe to toe of the pivoted shoes, said brake band being engageable with the drum by the shoes, and means for actuating the shoes to engage the brake band with the drum.

2. In a brake mechanism, a rotatable brake drum, a pair of rigid pivotally mounted brake shoes, a band surrounding the shoes extending substantially around the entire inner periphery of the drum, a pair of springs for withdrawing the intermediate portion of the band from the drum, a spring for withdrawing the ends of the band from the drum, means for moving said shoes to engage the band with the drum, causing the band to move relative to the shoes, and means for limiting said relative movement.

3. In a brake mechanism, a rotatable drum, a pair of brake shoes, a brake band surrounding said shoes extending from the toe of one shoe to the toe of the other, anchor members secured to the band, said shoes having slots for receiving the anchor members, flanges on the anchor members extending through said slots, upwardly inclined springs engaging said flanges for lifting the band and positioning for retaining the anchor members in their upper position in the inoperative position of the apparatus, and means causing the rotation of one of said anchor members in the direction of rotation of the drum in the operative position of the apparatus.

4. In a brake mechanism, a pair of pivoted brake shoes, a band surrounding the brake shoes extending from the toe of one brake shoe to the toe of the other brake shoe, said brake shoes having slots at their toe ends, flanges on the ends of the brake band extending through the slots in the brake shoes, and a spring secured to the inner ends of the flanges to withdraw the ends of the band and the brake shoes from the drum.

5. In a brake mechanism, a rotatable drum, a brake shoe having an arcuate surface, a raised portion at the ends of the arcuate surface, a band attached at its ends to the raised portion and spaced from the arcuate surface, a low friction strap secured to the surface of said band, a second band interposed between said low friction surface and the drum, means for moving the shoe for engaging the said band with the drum, allowing the band to slide a predetermined distance upon said low friction surface, and means for withdrawing the band and the shoe from the drum.

6. In a brake mechanism, a brake drum, a pair of pivotally mounted shoes, a flexible band including low friction surfaces secured to each shoe, a floating band between said surfaces and the drum, and means for moving said shoes to engage the floating band with said drum, said friction surfaces allowing a predetermined rotative directional movement of said floating band relative to one or the other of said friction surfaces, dependent upon the direction of rotation of said brake drum.

7. In a brake mechanism, a brake drum, a pair of pivotally mounted shoes, a flexible band including low friction surfaces secured to each shoe, a floating band between said surfaces and the drum means for moving said shoes to engage the floating band with said drum, said friction surfaces allowing a predetermined rotative directional movement of said floating band relative to one or the other of said friction surfaces, dependent upon the direction of rotation of said brake drum, and means for limiting said rotative movement.

8. In a brake mechanism, a brake drum, a pair of pivotally mounted shoes, a flexible band including low friction surfaces secured to each shoe, a floating band between said surfaces and the drum, means for moving said shoes to engage the floating band with said drum, said friction surfaces allowing a predetermined rotative directional movement of said floating band relative to one or the other of said friction surfaces, dependent upon the direction of rotation of said brake drum, and stop means on said floating bands cooperating with means on said shoes for limiting said rotative movement.

9. In a brake mechanism, a brake drum, a pair of pivotally mounted shoes, a flexible band including low friction surfaces secured to each shoe, a floating band extending substantially around the inner periphery of said drum, the portions of said floating band adjacent said friction surfaces being in contactual engagement therewith, and means for moving said shoes for engagement of said floating band with said drum, said frictional surfaces associated with the respective shoes allowing a predetermined directional rotative movement of a substantial portion of said floating band relative to one or the other of said friction surfaces, dependent upon the direction of rotation of said brake drum.

10. In a brake mechanism, a brake drum, a pair of pivotally mounted shoes, a flexible band including low friction surfaces secured to each shoe, a floating band extending substantially around the inner periphery of said drum, the portions of said floating band adjacent said friction surfaces being in contactual engagement therewith, and means for moving said shoes for engagement of said floating band with said drum, said frictional surfaces associated with the respective shoes allowing a predetermined directional rotative movement of a substantial portion of said floating band relative to one or the other of said friction surfaces, dependent upon the direction of rotation of said brake drum to permit adjustment of the floating band to conform to the peripheral contour of said drum.

11. In a brake mechanism, a rotatable brake drum, pivotally mounted brake shoes having raised end portions, a flexible band secured to the raised ends of each of said shoes to place said band in spaced relation with the arcuate surfaces of the respective shoes, low friction surfaces secured to said bands, a floating band extending substantially around the inner periphery of said drum, spring means for maintaining said floating band from engagement with said drum and the portions of said floating band adjacent said friction surfaces in contactual engagement therewith, and means for moving said shoes to engage the floating band with said rotating drum, said frictional surfaces associated with the respective shoes permitting said floating band limited directional rotative movement relative to one or the other of said surfaces, dependent upon the direction of rotation of said drum.

12. In a brake mechanism, a rotatable brake drum, pivotally mounted brake shoes having raised end portions, a flexible band secured to the raised ends of each of said shoes to place said band in spaced relation with the arcuate surfaces of the respective shoes, low friction surfaces secured to said bands, a floating band extending substantially around the inner periphery of said drum, spring means for maintaining said floating band from engagement with said drum and the portions of said floating band adjacent said friction surfaces in contactual engagement therewith, means for moving said shoes to engage the floating band with said rotating drum, said frictional surfaces associated with the respective shoes permitting said floating band limited directional rotative movement relative to one or the other of said surfaces, dependent upon the direction of rotation of said drum, and means for limiting said rotative movement.

In witness whereof, I hereunto subscribe my name this 4th day of April, 1929.

MALCOLM LOUGHEAD.